Sept. 30, 1969        G. MONCORGE        3,470,393

HIGH IONIZATION DENSITY THERMIONIC CONVERTERS

Filed Feb. 21, 1966

INVENTOR:
G. MONCORGE

BY Paul M. Craig, Jr.
ATTORNEY 3,470,393
HIGH IONIZATION DENSITY THERMIONIC CONVERTERS
Gerard Moncorge, Paris, France, assignor to CSF-Compagnie Generale de Telegraphie Sans Fil, a corporation of France
Filed Feb. 21, 1966, Ser. No. 528,983
Claims priority, application France, Feb. 24, 1965, 6,817
Int. Cl. H02n 3/00
U.S. Cl. 310—4
9 Claims

ABSTRACT OF THE DISCLOSURE

A thermionic converter in which the ion density of the ionizable substance is increased in the interelectrode space resulting in a higher output power through provision of an auxiliary diode operating in the arc mode near the interelectrode space of the principle diode operating in the non-ignited mode, the electrodes of the auxiliary diode being short-circuited and fixed at the potential of one of the electrodes of the principle diode.

---

Figure 1:
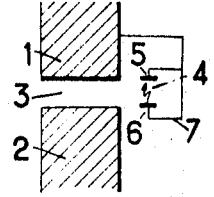

This invention relates to thermionic converters for directly converting thermal energy into electrical energy.

Such converters are formed by diodes filled with a vapor of an ionizable substance such as cesium at a low pressure. If in the presence of the ionizable substance the work function of the electrode that functions as an emitter is higher than that of the electrode that functions as a collector, the diodes behave as generators and yield an electrical voltage between the collector and the emitter when the latter is heated to a suitable temperature.

These diodes may operate either in the ignited mode of operation, also known as "the arc mode of operation," or in the non-ignited mode, depending on the choice of a certain number of physical parameters, such as the pressure and nature of the ionizable vapor, the interelectrode spacing, the temperatures of the electrodes and of the ionizable vapor, the emission properties of the emitter, etc. The arc mode operation yields a high ion density in the interelectrode space, consequently a high efficiency and a strong current; in contrast, the voltage obtained at the terminals is then relatively low and thus the output power is low in spite of the high current that traverses the diode.

Operation in the non-ignited mode, that is without an arc, provides at the output a relatively high voltage, but the volume ionization of the ionizable gas then is relatively low and thus the ion density is low; consequently the efficiency is poor, the current is relatively low and the output power is limited.

This invention has for its object a diode adapted to directly convert heat into electricity, in which the ion density of the ionizable substance is increased in the interelectrode space, whereby the current is increased and the efficiency improved, resulting in a higher output power as compared with known diodes operating under similar conditions either with or without an arc.

The present invention is characterized by the fact that near the interelectrode space of a principal diode, filled with a vapor of an ionizable material such as cesium and adapted to operate without an arc, there is disposed the interelectrode space of an auxiliary diode whose operating parameters are chosen to insure an arc mode operation, the electrodes of the auxiliary diode being short-circuited and fixed at the potential of either the emitter or the collector of the principal diode. The ions produced with a high density in the interelectrode space of the auxiliary diode thus diffuse into the interelectrode space of the principal diode and contribute to increase therein the ion density.

According to a preferred aspect of the present invention, the emitters of the principal and auxiliary diodes are merged into a single element.

Figure 2:
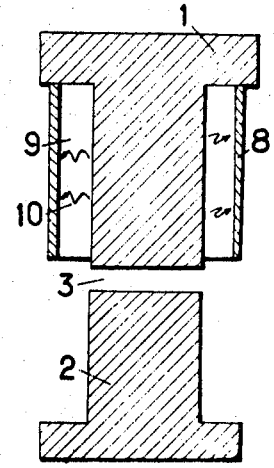
Figures 3, 4:
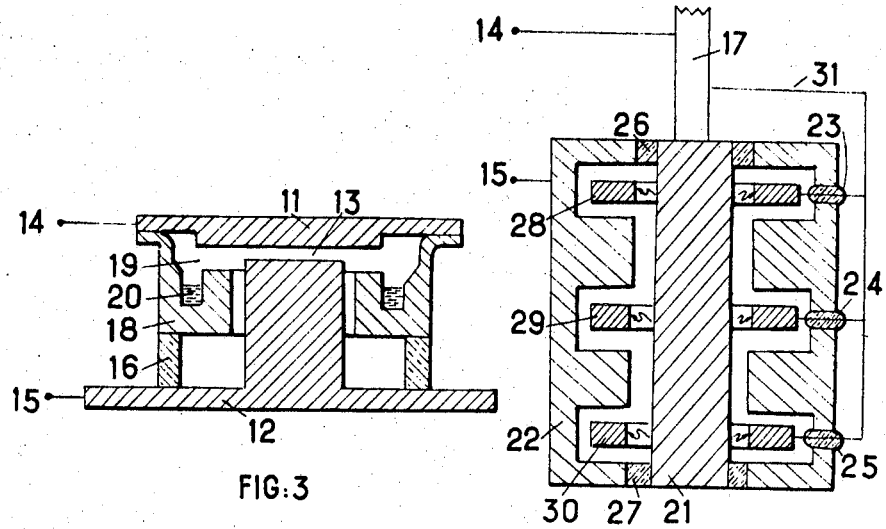

The invention will be best understood from the following description with reference to the drawing in which:

FIG. 1 represents schematically the prinicple of a diode in accordance with the invention, FIG. 2 shows an embodiment of the diode of FIG. 1, FIG. 3 is an axial cross section through a preferred embodiment of a plane diode in accordance with the present invention, and FIG. 4 is an axial cross section through an embodiment of a cylindrical diode that makes use of the principle of the present invention.

Referring now to FIG. 1, there is illustrated in this figure a converter diode composed of two electrodes, namely an emitter 1 and a colector 2, made of any suitable material. Near the space 3, comprised between electrodes 1 and 2, is arranged, in accordance with the present invention, the interelectrode space 4 defined by the emitter 5 and the collector 6 of an auxiliary diode. The electrodes 5 and 6 are short-circuited by the connection 7 and their potential is fixed by a connection, for example, to emitter 1. The parameter including the nature and the pressure of the ambient gas, the materials and temperatures of electrodes 5 and 6 and the width of spacing 4 are so chosen that an arc builds up in the auxiliary diode. This arc is schematically indicated in the drawing by a small flash of lightning in the space 4.

In FIG. 2, where the reference numerals 1, 2, 3 designate the same elements as in FIG. 1, the emitter 1 is common to the principal and auxiliary diodes, while the collector of the auxiliary diode is made in the form of a hollow cylinder of suitable material, which is different from that of emitter 1. The cylinder is secured onto emitter 1 whereby the auxiliary diode is short-circuited and its electrodes are fixed at the potential of emitter 1. The annular interelectrode space 9 of the auxiliary diode is given suitable sizes for obtaining the arc which is symbolized by the flashes 10 in the space 9.

FIG. 3 represents an axial section of a preferred embodiment of a plane diode. This diode comprises an emitter 11, for example, of rhenium, having an emissive surface, for example, of 3 cm.$^2$, whose central portion faces collector 12 of the principal diode, made for example of molybdenum with a surface of 2, 4 cm.$^2$, while the peripheral portion thereof faces colector 18 of the auxiliary diode.

Collector 18 has an annular form and may also be made of molybdenum, for example, with a surface of 0.6 cm.$^2$. The width of the interelectrode space 13 between electrodes 11 and 12 is 0.2 mm., and that of interelectrode space 19 between electrodes 11 and 18 is 1.5 mm. Collector 18 is conductively connected to the edges of emitter 11, and an annular cup 20 is provided for liquid cesium. On the other hand, collector 18 is insulated from collector 12 by an insulating ring 16.

Heating means of any suitable known type (not shown) are provided both for the emitter 11 and for the cesium in reservoir 20.

Assuming that emitter 11 is heated to 1500° K. while maintaining collector 12 at 700° K. and the cesium vapor at the temperature of 650° K., which corresponds to a pressure of a few torrs in the enclosure, it is verified that an arc is produced in the auxiliary interspace 19 while no arc appears in the principal space 13. Experience has shown that, under these conditions, between the output terminals 14 and 15 which are connected in the usual way to the emitter and collector of the principal diode, respectively, electrical energy of the order of at least 3 watts per cm.² of collector surface may be obtained. This result can be explained by the relative increase of the cesium ion density in space 13 of the principal diode.

In the modification of FIG. 4, which illustrates the application of the same principles to a cylindrical diode, there are represented a cylindrical emitter 21, fixed on a support 17 which may be heated, for example, by a flame, a collector 22 which forms a tight envelope with insulating rings 26 and 27 interposed between collector 22 and emitter 2, and a plurality of auxiliary collectors 28, 29, 30 shaped as rings. The connections of the rings traverse insulating passages 23, 24, 25, in the tight envelope and join the support 17 through connection 31. The terminals 14 and 15 are connected to the emitter and the collector like in FIG. 3. When the interior of the tight envelope is filled with ionizable vapor and the various parameters are suitably dimensioned, it is found that arcs are produced between the rings 28, 29, 30 and the emitter 21, yielding the same favorable result as in FIG. 3.

The present invention is not limited to the examples described and illustrated herein but admits various modifications as known by those skilled in the art by merely making use of the principle schematically illustrated in FIGS. 1 or 2. Consequently, I do not wish to be limited to the details shown and described herein but intend to cover all those changes and modifications as may be obvious to one of ordinary skill in the art.

I claim:
1. A thermionic converter for directly converting thermal energy into electricity, comprising within an enclosure filled with a vapor of an ionizable substance first, relatively large thermionic diode means adapted to operate in a non-ignited thermionic conversion mode of operation, and second, relatively small thermionic diode means adapted to operate in an ignited thermionic conversion mode of operation, each diode means including in effect emitter and collector electrode means defining therebetween an interelectrode space, the two diode means being arranged with their interelectrode spaces near each other.

2. The thermionic converter as claimed in claim 1, wherein the two electrode means of the second diode means are connected to each other and to one of the electrode means of the first diode.

3. The thermionic converter as claimed in claim 2, wherein the emitter electrode means of the two diode means are combined into a single element.

4. The thermionic converter as claimed in claim 2, wherein the collector electrode means of the two diode means are combined into a single element.

5. The thermionic converter as claimed in claim 3, wherein the collector electrode means of the second diode means surrounds the common emitter electrode means of the two diode means.

6. The thermionic converter as claimed in claim 2, wherein the second diode means is an annular cup surrounding the emitter electrode means of the first diode means.

7. The thermionic converter as claimed in claim 3, wherein the common emitter electrode means is a cylinder, while the collector electrode means of the two diode means are formed by a number of rings surrounding the cylinder.

8. The thermionic converter as claimed in claim 1, further comprising means for operating said first diode means in the non-ignited mode and said second diode means means in the ignited mode.

9. The thermionic converter as claimed in claim 8, wherein said further means includes heating means.

References Cited

UNITED STATES PATENTS

| | | | |
|---|---|---|---|
| 3,217,189 | 11/1965 | Bloss | 310—4 |
| 3,239,745 | 3/1966 | Hernquist | 322—2 |
| 3,312,840 | 4/1967 | Gabor | 310—4 |
| 3,329,885 | 7/1967 | Gabor et al. | 322—2 |
| 3,381,201 | 4/1968 | Angello | 321—2 |

OTHER REFERENCES

Direct Energy Conversion, Angrist, 1965, pp. 242–246.

MILTON O. HIRSHFIELD, Primary Examiner

D. F. DUGGAN, Assistant Examiner